(12) United States Patent
Ferrantello

(10) Patent No.: US 11,290,142 B2
(45) Date of Patent: Mar. 29, 2022

(54) GRIP FOR A MOBILE COMMUNICATION DEVICE

(71) Applicant: Frank S. Ferrantello, Plainview, NY (US)

(72) Inventor: Frank S. Ferrantello, Plainview, NY (US)

( * ) Notice: Subject to any disclaimer, the term of this patent is extended or adjusted under 35 U.S.C. 154(b) by 0 days.

(21) Appl. No.: 16/991,246

(22) Filed: Aug. 12, 2020

(65) Prior Publication Data
US 2022/0052722 A1    Feb. 17, 2022

(51) Int. Cl.
*H04B 1/3888*    (2015.01)

(52) U.S. Cl.
CPC .................................. *H04B 1/3888* (2013.01)

(58) Field of Classification Search
CPC . H04B 1/3888; A45C 11/00; A45C 2011/002; A45C 2011/003
See application file for complete search history.

(56) References Cited

U.S. PATENT DOCUMENTS

| 9,300,346 | B2 | 3/2016 | Hirsch |
| 9,344,135 | B2 | 5/2016 | Fiorentino |
| 2012/0299318 | A1 | 11/2012 | Murphy et al. |
| 2013/0279098 | A1* | 10/2013 | Cho ...................... G06F 1/1626 361/679.01 |
| 2014/0217135 | A1 | 8/2014 | Murphy et al. |
| 2015/0327642 | A1* | 11/2015 | Lee, Sr. .................... A45F 5/00 224/218 |
| 2016/0049983 | A1 | 2/2016 | Ripka |
| 2017/0086557 | A1* | 3/2017 | Choi .................... H04B 1/3888 |
| 2018/0220782 | A1* | 8/2018 | Mody ....................... A45F 5/00 |

FOREIGN PATENT DOCUMENTS

RU            155564 U1    10/2015

* cited by examiner

*Primary Examiner* — Ankur Jain
*Assistant Examiner* — Fatuma G Sherif
(74) *Attorney, Agent, or Firm* — Headland Law & Strategy; Matthew J. Smyth

(57) ABSTRACT

A grip is provided that includes a base defining a longitudinal cavity and is connectable with a mobile communication device. The base includes at least one bracket defining at least a portion of the cavity. A longitudinal member is disposable within the cavity and defines at least one finger opening. The member is movable relative to the at least one bracket. Device systems and methods of use are disclosed.

20 Claims, 6 Drawing Sheets

GRIP FOR A MOBILE COMMUNICATION DEVICE

TECHNICAL FIELD

The present disclosure generally relates to mobile communication devices, and more particularly to an apparatus for supporting a mobile communication device.

BACKGROUND

Mobile communication devices, for example, cellular phones are devices that are popular worldwide and there is an increasing need to improve handheld control of these devices due to, for example, the introduction of smartphone technology. Smartphone technology typically incorporates a touch screen interface, Internet access, and an operating system capable of executing downloaded applications, including, for example, digital identification applications, applications relating to management of assets, payment applications, and digital currency applications, all of which increase the functionality and personal security of the mobile communication devices. As the trend continues towards users carrying mobile communication devices with them throughout the day, the difficulty of holding the device comfortably and conveniently in one hand becomes problematic.

One reason why mobile communication devices can be uncomfortable and inconvenient to hold is due to their size and the trend towards even larger sized screens. This discomfort during use can be seen when performing a one-handed operation, such as using the communication device to take a self-portrait, for example, a "selfie" or for one-handed texting. Further, because of their size, mobile communication devices can be dropped easily, causing the device to be damaged or break. A user would then need to repair or purchase a new device, incurring unwanted expenses averaging about seven hundred to one thousand US dollars.

Currently, mobile communication device holders are available on the market to assist a user in holding the device. However, these holders are not ergonomic and can cause problems to a user, including, for example, fatigue, stress, strain, wear and tear, and long term deformation of one or more fingers of a user's hand, which has the potential to cause arthritis. This disclosure describes an improvement over these prior technologies, and enables the user to comfortably use the device while also protecting the mobile communication device.

SUMMARY

In one embodiment, in accordance with the principles of the present disclosure, a grip is provided that includes a base defining a longitudinal cavity and is connectable with a mobile communication device. The base includes at least one bracket defining at least a portion of the cavity. A longitudinal member is disposable within the cavity and defines at least one finger opening. The member is movable relative to the at least one bracket. In some embodiments, device systems and methods of use are disclosed.

In one embodiment, the grip includes a bracket defining a longitudinal slot and is connectable with a mobile communication device. A longitudinal shaft is disposable within the slot and defines a plurality of finger openings and an open bridge. The shaft is slidably disposable and rotatable about the longitudinal axis relative to the bracket.

In one embodiment, the grip includes a bracket defining a longitudinal slot and a first magnet. The bracket is connectable with a mobile communication device. A longitudinal shaft is disposable within the channel and includes a second magnet and defines at least one finger opening. The shaft is slidably disposable and rotatable about the longitudinal axis relative to the bracket.

BRIEF DESCRIPTION OF THE DRAWINGS

The present disclosure will become more readily apparent from the specific description accompanied by the following drawings, in which.

DETAILED DESCRIPTION

Figure 1:
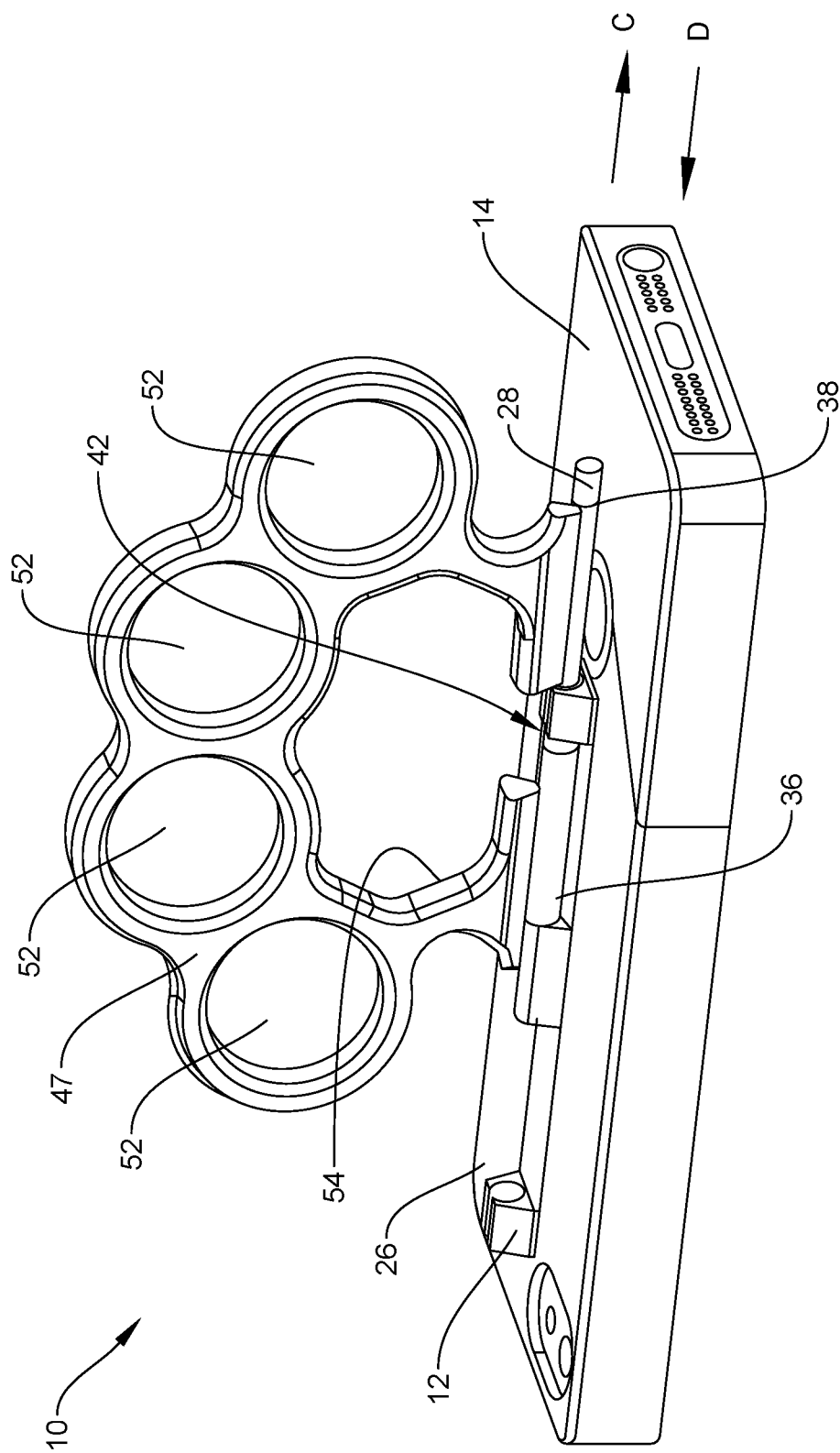
FIG. 1 is a perspective view of components of one embodiment of a device, in accordance with the principles of the present disclosure.

The present disclosure may be understood more readily by reference to the following detailed description of the disclosure taken in connection with the accompanying drawing figures, which form a part of this disclosure. It is to be understood that this disclosure is not limited to the specific devices, conditions or parameters described and/or shown herein, and that the terminology used herein is for the purpose of describing particular embodiments by way of example only and is not intended to be limiting of the claimed disclosure.

The exemplary embodiments of a device including a grip for a mobile communication device disclosed are discussed in terms of an apparatus for supporting a mobile communication device. In some embodiments, a device is provided for securely supporting a device, for example, a mobile communication device, including a smartphone. In some embodiments, the device includes a grip including one or more finger openings configured for receiving and engaging a user's finger or fingers. In some embodiments, the one or more finger openings engage a base that is secured to a back side of a device or a device case with for example, adhesive. The grip is configured to enable a user to comfortably and securely support the mobile communication device while a hand of the user is in an outstretched orientation. In some embodiments, the grip is configured to enable the user to have secure and full control of the mobile communication device during use and reduces the risk of the mobile communication device from being dropped.

In some embodiments, the grip provides ergonomic dexterity for operating the mobile communication device, for example during texting, while the grip is in a lower cradle orientation. In the cradle orientation, the grip is collapsed and flush with the back of the mobile communication device. In some embodiments, the grip reduces stress, strain, wear and tear, and long term deformation of one or more fingers of a user's hand, reducing the development of arthritis in a user. In some embodiments, the grip is configured such that a user is not required to stretch or bend any finger or wrist outside of its normal range of motion to support the mobile communication device during use.

In some embodiments, a device is provided for securely supporting a device, for example, a mobile communication device and is also implemented as a stand or holder for the mobile communication device. In some embodiments, the device includes a grip including one or more finger openings that engage a base. In some embodiments, the combination of the one or more finger openings and the base form a hinge. In some embodiments, the grip is configured for fixed engagement with a case that includes a business card holder. In some embodiments, the grip is fixed to a center of the case. In some embodiments, the grip in the stand or holder configuration can be adjusted at an angle relative to the mobile communication device and/or the case to provide comfort for the user and stability for the mobile communication device during use that is specifically selected by the user. In some embodiments, the grip is configured as a kickstand for the mobile communication device such that the mobile communication device can be positioned on a surface, for example, a table and the mobile communication device can be viewed at a selected angle. In some embodiments, the kickstand is configured as a horizontal or vertical kick stand.

In some embodiments, a device is provided for securely supporting a device, for example, a mobile communication device. The device includes a grip including one or more finger openings that engage a base. In some embodiments, the grip is configured for fixed engagement with a case that includes a wallette configured for holding for example, business cards, credit cards, and/or identification cards. In some embodiments, the device is configured as a mount for use in a vehicle such that the mobile communication device can be operated in a hands-free configuration during driving of the vehicle.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" or "top" and "bottom" are relative and used only in the context to the other, and are not necessarily "superior" and "inferior".

The following discussion includes a description of a grip for securely supporting a device, for example, a mobile communication device, including a smartphone and/or a tablet in accordance with the principles of the present disclosure. Alternate embodiments are also disclosed. Reference will now be made in detail to the exemplary embodiments of the present disclosure, which are illustrated in the accompanying figures. Turning to FIGS. 1-6, there are illustrated components of a grip device 10.

Grip 10 includes a base, for example, a bracket 12 that is connectable with a mobile communication device 14, as shown in FIG. 1. In some embodiments, mobile communication device 14 includes, for example, a cellphone, smartphone, personal digital assistant, and/or a tablet computer. Bracket 12 includes a proximal end 16 and a distal end 18, and defines a longitudinal axis AA. Bracket 12 may have various cross-section configurations, for example, arcuate, cylindrical, oblong, rectangular, polygonal, undulating, irregular, uniform, non-uniform, consistent, variable, and/or U-shape. In some embodiments, bracket 12 may have alternate surface configurations, for example, rough, undulating, porous, semi-porous, dimpled, polished and/or textured.

Figure 2:
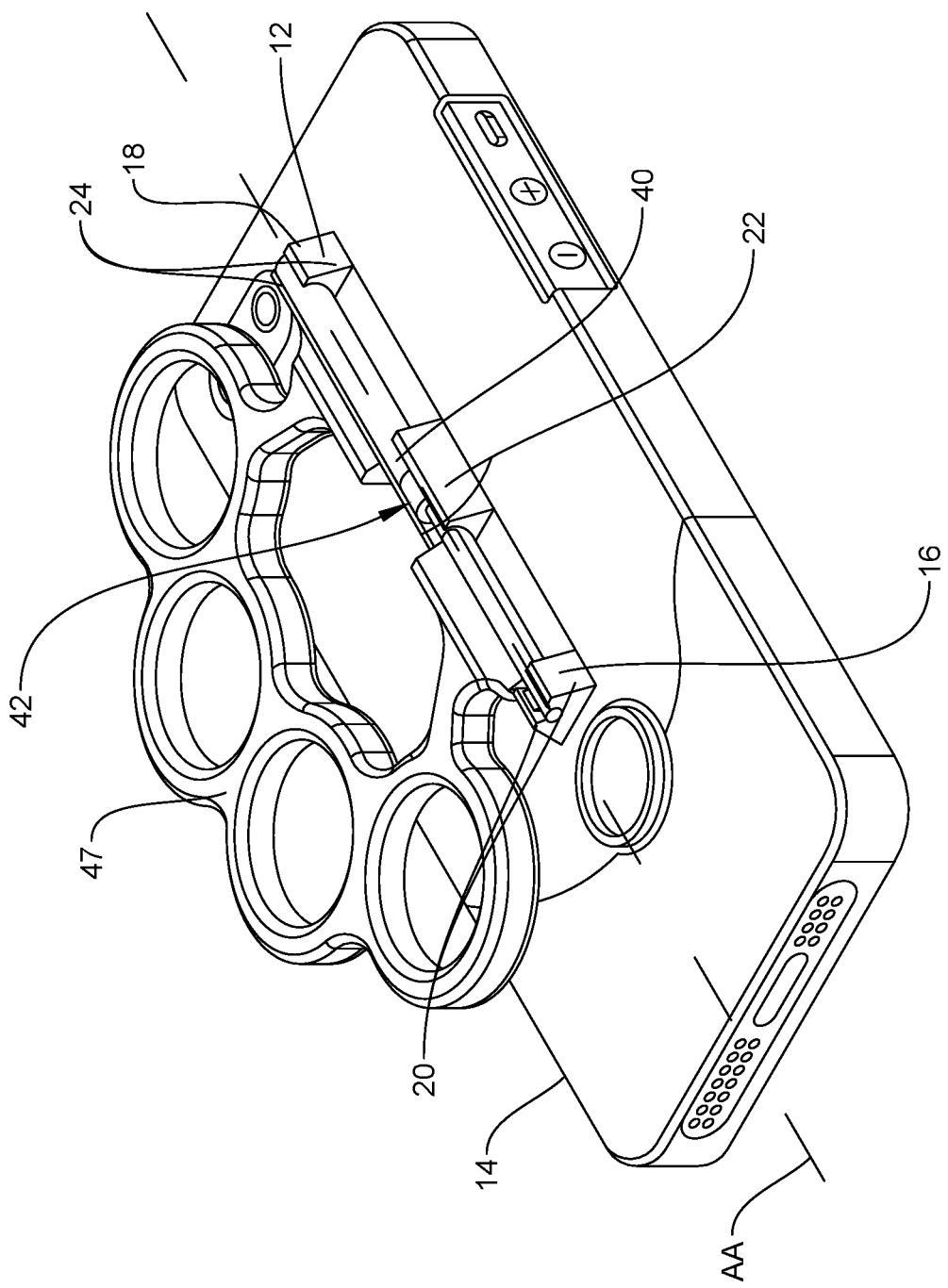
FIG. 2 is a perspective view of the components shown in FIG. 1.

Bracket 12 includes sets of spaced apart channels 20, 22, 24 as shown in FIG. 2. Channels 20, 22, 24 define a longitudinal cavity, for example, slot 26, as shown in FIG. 1. Slot 26 is configured for disposal with a longitudinal member, for example, a shaft 28 that is movably disposable within slot 26, as described herein. Channels 20, 22, 24 may have various cross-section configurations, for example, arcuate, cylindrical, oblong, rectangular, polygonal, undulating, irregular, uniform, non-uniform, consistent, variable, and/or U-shape. In some embodiments, channels 20, 22, 24 may have alternate surface configurations, for example, rough, undulating, porous, semi-porous, dimpled, polished and/or textured. In some embodiments, channels 20, 22, 24 are configured as knuckles of a hinge, as described herein.

Figure 3:
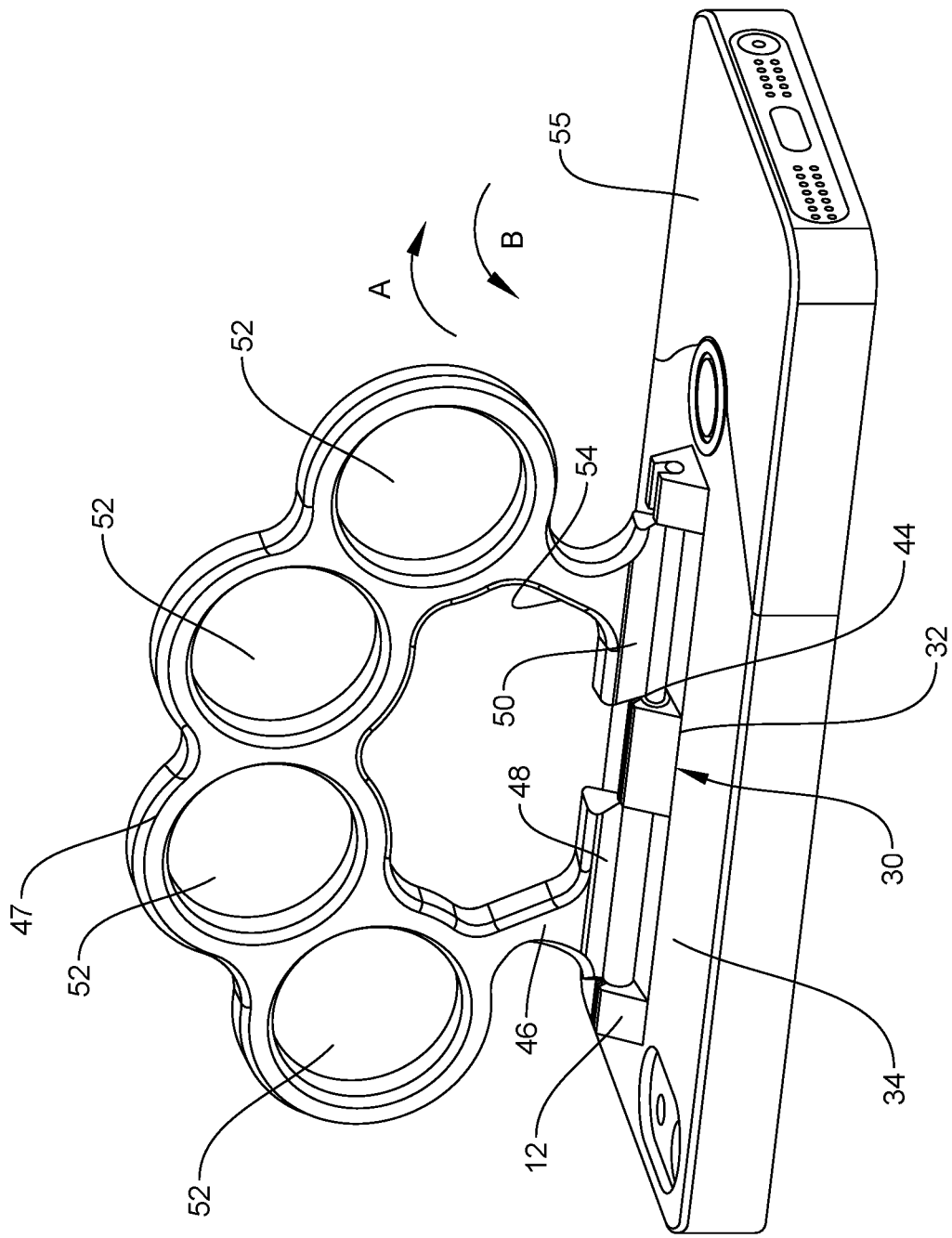
FIG. 3 is a perspective view of the components shown in FIG. 1.

Bracket 12 includes a surface 30 that defines a bottom 32 that is configured for fixed engagement with a surface 34 of mobile communication device 14, as shown in FIG. 3. In some embodiments, bottom 32 is fixed to surface 34 via adhesive. In some embodiments, bottom 32 is fixed to surface 34 via Velcro®, snaps, buttons, hooks, mutual grooves, screws, adhesive, nails, barbs, raised elements, spikes, clips, friction fittings, compressive fittings, expanding rivets, staples, fixation plates, key/keyslot, tongue in groove, dovetail, magnetic connection and/or posts.

Shaft 28 includes an end 36 and an end 38, and is disposed with longitudinal axis AA, as shown in FIG. 1. Shaft 28 may have various cross-section configurations, for example, arcuate, cylindrical, oblong, rectangular, polygonal, undulating, irregular, uniform, non-uniform, consistent, variable, and/or U-shape. In some embodiments, shaft 28 may have alternate surface configurations, for example, rough, undulating, porous, semi-porous, dimpled, polished and/or textured.

A magnet 42 is disposed on a surface 40 of shaft 28, as shown in FIG. 2. Magnet 42 is configured for engagement with a magnet 44 disposed with channel 22, as shown in FIG. 3 to fix or lock shaft 28 with slot 26 in a selected orientation, as described herein. When shaft 28 is fixed with slot 26, shaft 28 is rotatable at a selected angle relative to bracket 12. In some embodiments, magnet 42 has a positive side exposed and magnet 44 has a negative side exposed. In some embodiments, shaft 28 and channel 22 alternatively include snaps, mutual grooves, clips, friction fittings, compressive fittings, key/keyslot, tongue in groove, and/or a dovetail connection.

Shaft 28 includes a surface 46 that defines a body 47, as shown in FIG. 1. Body 47 is configured for engagement with a user's hand for gripping such that mobile communication device 14 can be supported by the user. In some embodiments, body 47 can be regular, irregular and/or freeform shaped. In some embodiments, body 47 may have alternate surface configurations, for example, rough, undulating, porous, semi-porous, dimpled, polished and/or textured to facilitate a grip by the user.

Body 47 includes spaced apart portions 48, 50, as shown in FIG. 3. Portions 48, 50 are configured for engagement with channels 20, 22, 24 to form a hinge configuration with bracket 12. In some embodiments, portions 48, 50 can be knuckles of a hinge, as described herein.

Figure 6:
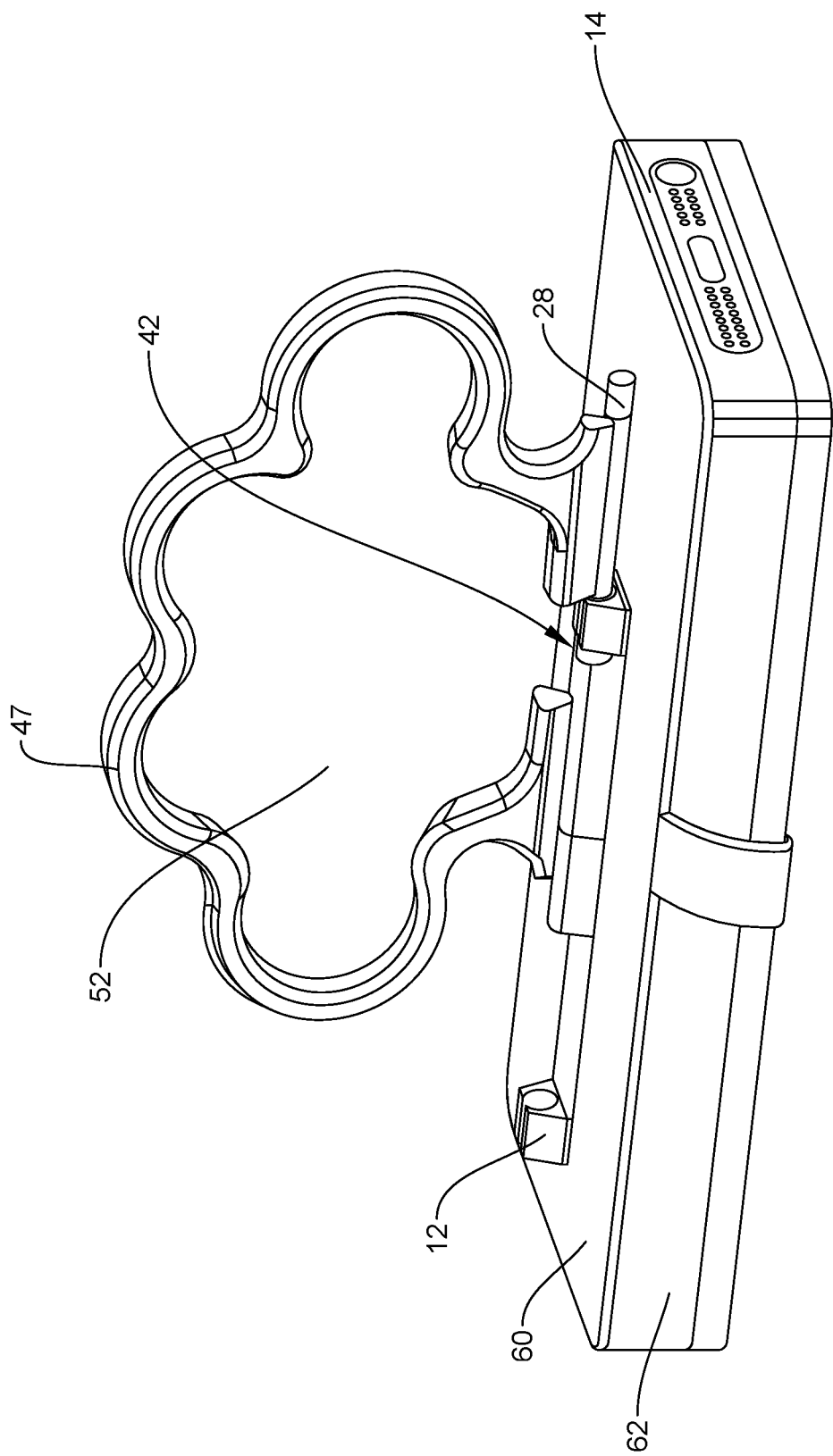
FIG. 6 is a perspective view of components of one embodiment of a device, in accordance with the principles of the present disclosure.

Body 47 defines finger openings 52 configured for engagement with fingers of a user to facilitate supporting of mobile communication device 14, as shown in FIGS. 1-3. Openings 52 enable a user to comfortably and securely support mobile communication device 14 while a hand of the user is in an outstretched orientation. Openings 52 are disposed adjacent relative to each other. Openings 52 are circular and in some embodiments, openings 52 can be variously configured, including nonagon, octagon, heptagon, hexagon, triangle, scalene triangle, right triangle, parallelogram, rhombus, square, pentagon, oval, heart, cross, arrow, cube, cylinder, star, crescent, a wavy line, semicircular, ring and/or quatrefoil shaped. In some embodiments, openings 52 can be regular, irregular and/or freeform shaped. In some embodiments, openings 52 may have alternate surface configurations, for example, rough, undulating, porous, semi-porous, dimpled, polished and/or textured to facilitate a grip by the user. In some embodiments, grip 10 may include one or a plurality of openings 52. As shown in FIG. 6, grip 10 alternatively includes a single opening 52.

Figure 5:
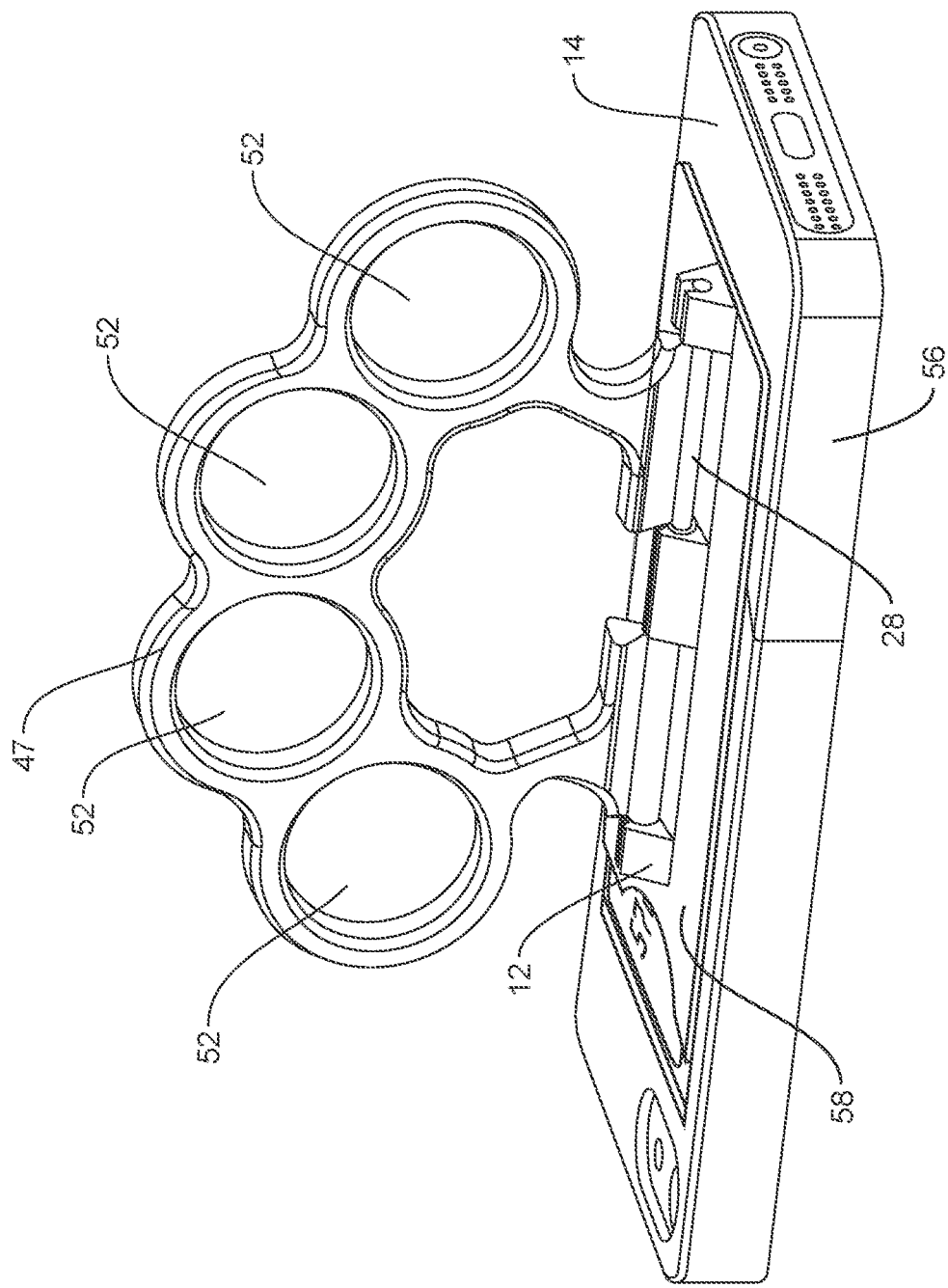
FIG. 5 is a perspective view of components of one embodiment of a device, in accordance with the principles of the present disclosure.

Surface 46 defines an open bridge 54 disposed inferior relative to openings 52, as shown in FIGS. 1-3. Bridge 54 is configured for engagement with a palm of a user to facilitate supporting of mobile communication device 14. In some embodiments, bridge 54 can be variously configured, including circular, nonagon, octagon, heptagon, hexagon, triangle, scalene triangle, right triangle, parallelogram, rhombus, square, pentagon, oval, heart, cross, arrow, cube, cylinder, star, crescent, a wavy line, semicircular, ring and/or quatrefoil shaped. In some embodiments, bridge 54 can be regular, irregular and/or freeform shaped. In some embodiments, bridge 54 may have alternate surface configurations, for example, rough, undulating, porous, semi-porous, dimpled, polished and/or textured to facilitate a grip by the user. In some embodiments, grip 10 may include one or a plurality of bridges 54. As shown in FIG. 5, grip 10 alternatively includes openings 52 without a bridge 54.

Figure 4:
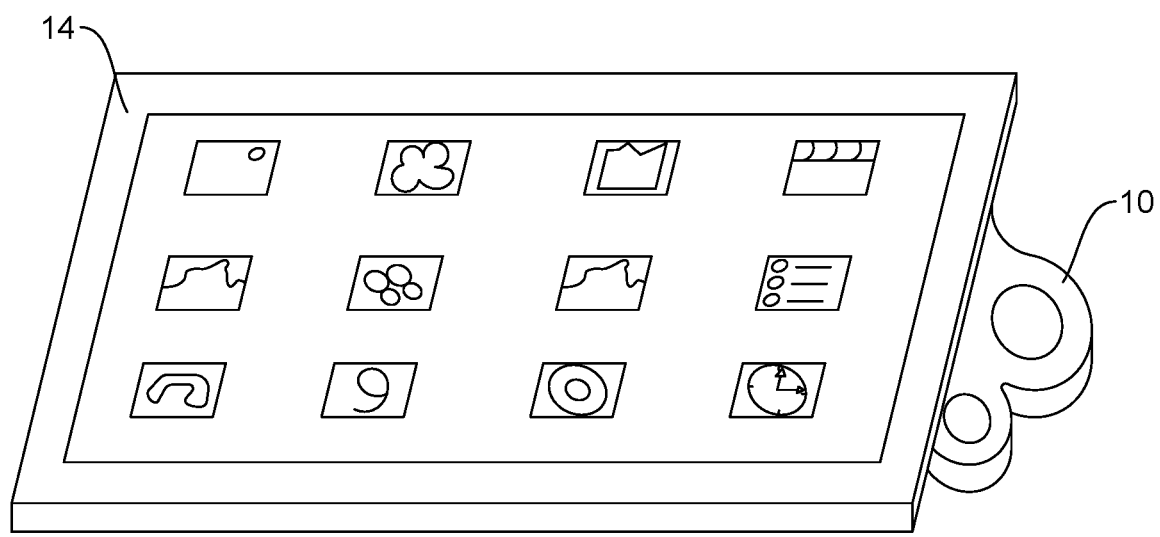
FIG. 4 is a perspective view of components of one embodiment of a device, in accordance with the principles of the present disclosure.

As shown in FIG. 2, shaft 28 is slidably disposable within slot 26 and rotatable about longitudinal axis AA. Shaft 28 is rotatable at a selected angle relative to bracket 12 such that the user can place grip 10 in a selected orientation when supporting mobile communication device 14. As shown in FIG. 4, shaft 28 is selectively fixed at an angle relative to bracket 12 to form a stand configuration for mobile communication device 14. In the stand configuration, mobile communication device 14 can be placed on a surface and mobile communication device 14 will be oriented in an angled upright position such that the user can operate mobile communication device 14 without the user supporting mobile communication device 14.

In some embodiments, shaft 28 is slidably disposable within slot 26 such that shaft 28 can be disconnected from bracket 12. In some embodiments, shaft 28 can be disconnected from bracket 12 to interchange multiple embodiments of grip 10 with bracket 12, as described herein. In some embodiments, bracket 12 includes a case 55 for mobile communication device 14, as shown in FIG. 3. In some embodiments, bracket 12 is monolithic with the case.

In use, when grip 10 is connected to mobile communication device 14 and is implemented by a user, grip 10 is configured to enable the user to comfortably and securely support mobile communication device 14 while a hand of the user is in an outstretched orientation. In some embodiments, grip 10 is configured to enable the user to have secure and full control of mobile communication device 14 during use and reduces the risk of mobile communication device 14 being dropped. The user engages body 47 of grip 10 and orients fingers of a hand through openings 52. The palm of the user will engage bridge 54. The user can rotate body 47 of grip 10 in directions, as shown by arrows A and B in FIG. 3, to adjust the angle that body 47 of grip 10 is oriented in. For example, body 47 of grip 10 can be rotated in the direction shown by arrow A to place body 47 of grip 10 into a cradle orientation, as shown in FIG. 2, so that the user can text. In the cradle orientation, body 47 of grip 10 is collapsed and engages with surface 34 of mobile communication device 14.

To remove shaft 28 from mobile communication device 14, shaft 28 is translated in a direction, as shown by arrow C in FIG. 1, such that shaft 28 translates through slot 26 until shaft 28 disengages from bracket 12. To attach shaft 28 with bracket 12, shaft 28 is translated in a direction, as shown by arrow D in FIG. 1, such that shaft 28 translates through slot 26 until magnet 42 of shaft 28 engages with magnet 44 of bracket 12, fixing shaft 28 with bracket 12.

In one embodiment, as shown in FIG. 5, bracket 12 includes a case 56 that includes a business card holder 58. In one embodiment, as shown in FIG. 6, bracket 12 includes a case 60 that includes a wallette 62 configured for engagement with mobile communication device 14 and is implemented to store items including, for example, credit cards, business cards, social security cards, and/or money.

In some embodiments, all or a portion of grip 10 and/or components of case 55, 56 and/or 60 is made from a material including, for example, plastic, chromed or coated plastic, flexible plastic, steel, stainless steel, aluminum, fabric, leather, patent-leather, silicone, and/or rubber.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended.

What is claimed is:
1. A device comprising:
a base configured to be coupled to a mobile communication device;
a handle comprising a grip and a shaft, the shaft characterized by a longitudinal handle axis, the grip coupled to the shaft at spaced-apart portions that include a first connecting region and a second connecting region;
a bracket disposed on the base, the bracket comprising a distal anchor, a proximal anchor and a middle anchor; each of the distal anchor, proximal anchor and middle anchor having a channel that is coaxial with a longitudinal bracket axis; the distal anchor spaced apart from the middle anchor by a first separation space, and the middle anchor spaced apart from the proximal anchor by a second separation space;
wherein the channel accommodates the shaft and allows the shaft to be slidably translated along and rotated about the longitudinal bracket axis and longitudinal handle axis within the channel between a first orientation, in which the handle and grip are rotated flush with the base; and a second orientation that is different than the first orientation, in which the handle and grip are fixed at an angle relative to the base.

2. The device of claim 1, wherein the handle is selectively fixed at an angle relative to the base to form a stand.

3. The device of claim 1, wherein the handle further comprises a first magnet, the bracket further comprises a second magnet, and the first magnet and second magnet cooperate to fix the handle and the grip in the second orientation.

4. The device of claim 1, wherein the grip comprises four finger openings disposed adjacent to each other.

5. The device of claim 1, wherein the grip further comprises a palm opening between the four finger openings and the shaft.

6. The device of claim 1, wherein the base comprises a case for the mobile communication device or a surface having an adhesive configured to adhere to a portion of the mobile communication device.

7. The device of claim 1, wherein the base includes a wallette that is configured to retain business cards, credit cards and/or identification cards.

8. The device of claim 1, wherein the handle and bracket are dimensioned such that in the first orientation, the first separation space accommodates the first connecting region and the second separation space accommodates the second connecting region.

9. The device of claim 1, wherein the channel is configured as a keyslot and the first connecting region and second connecting region form corresponding keys, wherein the keyslot and keys cooperate to fix the handle and grip in the second orientation.

10. The device of claim 1, wherein the channel and the first connecting region and/or second connecting region cooperate to make a tongue-and-groove or dovetail connection to fix the handle and grip in the second orientation.

11. The device of claim 1, wherein the channel has a cross-section configuration characterized by one of arcuate, cylindrical, oblong, rectangular, polygonal, undulating, irregular or U-shaped; and the shaft has a corresponding configuration that is accommodated by the channel.

12. A device comprising:
a base comprising a holder for a mobile communication device;
a bracket disposed on the base, the bracket comprising a distal anchor, proximal anchor and middle anchor; each of the distal anchor, proximal anchor and middle anchor having a channel that is coaxial with a longitudinal bracket axis; the distal anchor spaced apart from the middle anchor by a first separation space, and the middle anchor spaced apart from the proximal anchor by a second separation space;
a handle comprising a grip and a shaft, the shaft characterized by a longitudinal handle axis, the grip coupled to the shaft at spaced-apart portions that include a first connecting region and a second connecting region;
wherein the channel accommodates the shaft and allows the shaft to be slidably translated along and rotated about the longitudinal bracket axis and longitudinal handle axis within the channel between a first orientation, in which the handle and grip are rotated flush with the base; and a second orientation that is different than the first orientation, in which the handle and grip are fixed at an angle relative to the base; wherein the handle and bracket are dimensioned such that in the first orientation, the first separation space accommodates the first connecting region and the second separation space accommodates the second connecting region; and wherein channel is configured as a keyslot and the first connecting region and second connecting region form corresponding keys, wherein the keyslot and keys cooperate to fix the handle and grip in the second orientation.

13. The device of claim 12, wherein the grip comprises four finger openings disposed adjacent to each other.

14. The device of claim 12, wherein the grip further comprises a palm opening between the four finger openings and the shaft.

15. The device of claim 12, wherein the holder comprises a case for the mobile communication device.

16. The device of claim 12, wherein the holder comprises a surface having an adhesive configured to adhere to a portion of the mobile communication device.

17. A device comprising:
a base comprising a holder for a mobile communication device;
a bracket disposed on the base, the bracket comprising a distal anchor, proximal anchor and middle anchor; each of the distal anchor, proximal anchor and middle anchor having a channel that is coaxial with a longitudinal bracket axis; the distal anchor spaced apart from the middle anchor by a first separation space, and the middle anchor spaced apart from the proximal anchor by a second separation space;
a handle comprising a grip and a shaft, the shaft characterized by a longitudinal handle axis, the grip coupled to the shaft at spaced-apart portions that include a first connecting region and a second connecting region;
wherein the channel accommodates the shaft and allows the shaft to be slidably translated along and rotated about the longitudinal bracket axis and longitudinal handle axis within the channel between a first orientation, in which the handle and grip are rotated flush with the base; and a second orientation that is different than the first orientation, in which the handle and grip are fixed at an angle relative to the base; wherein the handle and bracket are dimensioned such that in the first orientation, the first separation space accommodates the first connecting region and the second separation space accommodates the second connecting region; and wherein the handle further comprises a first magnet, the bracket further comprises a second magnet, and the first magnet and second magnet cooperate to fix the handle and the grip in the second orientation.

18. The device of claim 17, wherein the channel has a cross-section configuration characterized by one of arcuate, cylindrical, oblong, rectangular, polygonal, undulating, irregular or U-shaped; and the shaft has a corresponding configuration that is accommodated by the channel.

19. The device of claim 17, wherein the grip comprises four finger openings disposed adjacent to each other and a palm opening between the four finger openings and the shaft.

20. The device of claim 17, wherein the holder comprises at least one of a case for the mobile communication device and a surface having an adhesive configured to adhere to a portion of the mobile communication device.

* * * * *